US 8,168,048 B1

(12) United States Patent
Maget

(10) Patent No.: US 8,168,048 B1
(45) Date of Patent: May 1, 2012

(54) CARBON DIOXIDE GENERATION AND DISPENSING DEVICE AND METHOD OF PRODUCTION

(75) Inventor: Henri J. R. Maget, La Jolla, CA (US)

(73) Assignee: M&R Consulting Services, Inc., San Diego, CA (US)

( * ) Notice: Subject to any disclaimer, the term of this patent is extended or adjusted under 35 U.S.C. 154(b) by 1075 days.

(21) Appl. No.: 12/038,342

(22) Filed: Feb. 27, 2008

Related U.S. Application Data

(63) Continuation-in-part of application No. 11/650,016, filed on Jan. 5, 2007, now Pat. No. 7,785,450.

(60) Provisional application No. 60/765,392, filed on Feb. 3, 2006.

(51) Int. Cl.
*C25B 1/00* (2006.01)
*C25B 9/00* (2006.01)
*C25B 15/08* (2006.01)

(52) U.S. Cl. .................. 204/278; 204/242; 204/275.1; 205/555

(58) Field of Classification Search .............. 204/242, 204/275.1, 278; 205/255, 555
See application file for complete search history.

(56) References Cited

U.S. PATENT DOCUMENTS

| 606,981 | A | * | 7/1898 | Romme | 205/516 |
| 3,017,335 | A | * | 1/1962 | Wolfe, Jr. | 205/356 |
| 4,062,745 | A | * | 12/1977 | Buvet et al. | 205/703 |
| 6,692,621 | B1 | * | 2/2004 | Chancellor | 204/278 |
| 6,780,304 | B1 | * | 8/2004 | Maget | 205/555 |
| 2003/0205482 | A1 | * | 11/2003 | Allen | 205/630 |
| 2004/0195090 | A1 | * | 10/2004 | Omasa | 204/273 |
| 2005/0000800 | A1 | * | 1/2005 | Speranza et al. | 204/258 |

* cited by examiner

*Primary Examiner* — Mark F Huff
*Assistant Examiner* — Ciel Thomas
(74) *Attorney, Agent, or Firm* — Steins & Associates, P.C.

(57) ABSTRACT

A $CO_2$ generating and dispensing device having container with a first space for receiving oxalic acid and water, and a second space for receiving a $CO_2$ generator which generator is attached to a lid. The lid secures to the container. Two conductive rods extend above the lid and are attached to the $CO_2$ generator. Electric current is applied to the rods which initiates the $CO_2$ generation. Generated $CO_2$ rises from the second space and out a discharge vent on the lid. An hose attached to the discharge vent direct the $CO_2$ to a pre-determined destination.

11 Claims, 2 Drawing Sheets

CARBON DIOXIDE GENERATION AND DISPENSING DEVICE AND METHOD OF PRODUCTION

CROSS REFERENCES TO RELATED APPLICATIONS

This application is a continuation-in-part of nonprovisional application, application Ser. No. 11/650,016 filed on Jan. 5, 2007 now U.S. Pat. No. 7,785,450, which claims the benefit of U.S. Provisional Application No. 60/765,392, filed on Feb. 3, 2006.

STATEMENT REGARDING FEDERALLY-SPONSORED RESEARCH OR DEVELOPMENT

The research and work for the development of this entire carbon dioxide generation process and the components associated therewith is partially funded by a United States Department of Agriculture grant, Grant Number 2006-33610-17503.

BACKGROUND

This device relates to an improvement in the generation of carbon dioxide, and more particularly to a self-sustaining, on-site generation of carbon dioxide.

Commercial carbon dioxide is widely used and is generally manufactured by separation and purification from carbon-dioxide-rich gases produced by combustion or by biological processes. It is also found in underground formations in some states. Carbon dioxide is also commercially available as high-pressure cylinder gas [about 300 psig], in refrigerated liquid form, or as a solid [dry ice].

Common uses of carbon dioxide include, among other uses, use in fire extinguishing systems, for carbonation of soft drinks and beer, freezing of food products, refrigeration and maintenance of environmental conditions during transportation of food products, enhancement of oil recovery from wells, materials production [such as plastics and rubber], and treatment of alkaline water, as a shield during welding where it protects the weld against oxidation, dry ice pellets for sand blasting surfaces without leaving residues, in the chemical processing industry such as methanol production, for priming oil wells to maintain pressure in the oil formation, for removing flash from rubber or plastic objects by tumbling with dry ice, for the creation of inert blankets or environments, for the prevention of fungal and bacterial growth, as an additive to oxygen for medical use, as a propellant in aerosol cans, and to aid in maintaining a level of 1000 ppm in green houses to increase production yields of vegetables and flowers, to name a few.

To meet the needs of these various applications, requiring from small quantities of carbon dioxide (less than a pound/day) to extremely large quantities (tons/day), carbon dioxide is available as a compressed gas requiring heavy cylinders, or a liquid under pressure available from tube or liquid trailers, or as solid dry ice.

Very small users rely on high pressure cylinders. Their distribution is generally conducted by locally-focused businesses that buy the gas in bulk liquid form and package it at their facilities. Small to medium size customers truck-in bulk liquid products that are then processed through evaporation to produce the gas. Larger customers' needs are often met with "tube trailers", i.e., bundles of high-pressure cylinders mounted on wheeled platforms. Onsite" plants are usually installed by customers consuming more than 10 tons/day of the gas.

There is an increasing interest in user-owned, small, non-cryogenic gas generators, in many markets. Such generators are available for oxygen, hydrogen and nitrogen, but not for carbon dioxide. For example, small to medium size users of oxygen or nitrogen may find an economical supply alternative in pressure-swing-adsorption (PSA) plants. Or again, hydrogen and oxygen may be produced through electrolysis of water. High purity hydrogen may then be produced by purification of the stream by using palladium foil diffusers.

To-date, "on-site" economical carbon dioxide generators, such as are available for hydrogen and oxygen, do not exist, although the demand for carbon dioxide is substantial. Moreover, the benefits of these "on-site" generators are multiple. For example, generation on demand, as needed independence from suppliers and possible supply interruptions, cost-insensitivity to supply issues no need for pressure vessels, their storage and recycling, and the like.

To meet this need, applicant has invented an electrolytic process and methods to produce carbon dioxide from organic acids which were originally described in U.S. Pat. Nos. 6,780,304 and 6,387,228. Applicant has pursued the development of that generation technology by developing multiple electrochemical cells assembled in stacks to achieve production rates and volumes much larger than those described in these patents.

Continuing in this vein, applicant has now designed an entire, self-sufficient carbon dioxide generation system comprised of solar panels, an electronic control unit for the transfer of solar energy to a battery, an electronic control module controlling the current output to an electrochemical carbon dioxide generator [electrolyzer] such as disclosed in applicant's pending application, application Ser. No. 11/650,016 filed on Jan. 5, 2007, which is hereby incorporated by reference.

The preferred mode utilizes the carbon dioxide generator disclosed in applicant's pending application ['016] which comprises a stack of at least two electrochemical cells, though any on-site carbon dioxide generator suited for the intended purpose may be used. The targeted carbon dioxide generation rate was 12 Liters/hour (0.05 lb/hr) for a duration of 10 hours per day, however, the system has been designed to, and can, generate in excess of 45 L/hr (0.18 lb/hr).

To create the self-sufficient carbon dioxide generation system applicant first devised a novel process to produce solid oxalic acid [OA] toroidal "briquets" weighing about 2 kg. each for placement and use in the novel dispenser. This generation and dispensing device designed by applicant forms the primary subject matter of this current application. Assembling and placing four such toroidal briquets into the device would allow for autonomous system operation and carbon dioxide generation for about one month, provided adequate solar energy can be harvested to sustain operation.

These oxalic acid [OA] toroidal briquets are used as the source for carbon dioxide generation. Anhydrous OA contains as much as 97.7 wt % carbon dioxide and therefore is the preferred source though, in some instances, oxalic acid dihydrate [OA 2$H_2O$] can also be used. As developed by applicant, each toroidal briquet has an external diameter of approximately 25 cm, an internal diameter of approximately 10 cm, a thickness of approximately 3.5 cm, and weighs approximately 2.1 kg. A single toroidal briquet is adequate to support operation, at the nominal 12L/hr rate, for up to 9 days. As many as four such toroidal briquets can be stacked up in applicant's generating and dispensing device.

It should be understood that the size and dimensions of the toroidal briquet can vary as can the dimensions of the generating and dispensing device to accommodate the varying sizes of the toroidal briquet.

The toroidal briquets are compact, solid OA that can be easily handled without undue precaution. The ability to stack these toroidal briquets is the key component of the sub-system which makes the generating and dispensing device the vital and indispensable component thereof. The generating and dispensing device has an inner chamber inside of which the carbon dioxide generator of my pending application ['615], one or more, may be housed and outside of which the toroidal briquets are stacked. An upstanding inner cylindrical wall [central pipe] extending from the floor of the generating and dispensing device up to approximately its top form a barrier between the carbon dioxide generator and the toroidal briquets. With current applied to the carbon dioxide generator and the desired carbon dioxide generation rate is set, the system will generate carbon dioxide without any human oversight, interface, or maintenance.

Through experimentation is has been shown that the system is capable of producing approximately 9.12 L/hr of carbon dioxide per amp. A current load of approximately 1.32 amps has been shown to be adequate to achieve the nominal carbon dioxide generation rate. A current load of approximately 3.29 amps has proven to be adequate to generate approximately 30 L carbon dioxide/hr.

Under these current loads the voltage applied to an electrolyzer, for example, holding 10 electrochemical cells, in series connection, is approximately 12 volts. Consequently, a 12-volt battery should be adequate for the entire system for adequate operation and uninterrupted and unsupervised carbon dioxide generation. The nominal power requirement should be between approximately 16 watts to approximately 40 watts for a maximum rate of production of approximately 30 L/hr of carbon dioxide. With the system operating for approximately 10 hours/day, the total daily energy required will be approximately 160 to 400 watt-hours.

The container of the generating and dispensing device is approximately 30 cm in diameter and approximately 16 cm high. The upstanding inner cylindrical wall [or central pipe] has a diameter which is smaller than the diameter of the inner diameter of the toroidal briquet. Given this configuration it can been seen that up to four toroidal briquets can be staked into the container. A lid is securely attached to the container. It has through holes for the stack terminals and the exhaust gas. The thick-walled container has been especially molded for this application. The toroidal briquets are to be located between the outer wall of the container and its upstanding inner cylindrical wall. As previously mentioned, this upstanding inner cylindrical wall is attached to the floor of the container and prevents the OA toroidal briquets from interfering with the extraction of the stack of toroidal briquets, should maintenance be required.

Before operation approximately 1-2 pints of water are poured into the container to initiate the process to dissolve the bottom most OA toroidal briquet.

The system has been designed to operate during night-time hours. Therefore any solar-generated energy is to be stored for nighttime consumption. The battery described above is selected on the basis of its ability to store sufficient energy for 1-2 days of operation during cloudy days. The battery voltage is selected for its compatibility with solar panels and the current load required by the electrolyzer [carbon dioxide generator]. As noted above a 12-volt, 55 A-hr battery is adequate for the nominal generation rate. The battery selected is a 490T SunXtender. A larger battery such as a 560T or 690T model with storage capacity of 63 and 79 A-hr will be needed for the sustained operation at 30 L/hr.

Two control units are necessary to the operation of the system as described; a conventional commercially-available charge controller and a commercially-available modified load current controller. A typical charge controller, such as a Steca PR 110 unit is suitable for the intended purpose. Its main function is the regulation of current and voltage between panels and the battery to optimize battery charging without overload, and the like.

The load controller developed as part of this project provides current regulation from the battery to the electrolyzer [carbon dioxide generator]. The unit design is based on Linear Technology model LTC3780 Buck-Boost Controller, configured as a constant current source. The circuitry provides for efficient power conversion from battery to load while operating over a wide range of input voltages and load impedances. Presently the efficiency of either controller is estimated at approximately 90%. For energy efficient systems this could be increased by careful selection of certain components.

The primary source of energy contemplated is solar energy which is collected during the daytime and stored into a conventional commercially-available rechargeable battery. Surplus solar energy is dumped when the battery is fully charged. If adequate solar energy is not available, the load will extract energy mainly from the battery and progressively go dormant [the load current decreases] to protect the battery from deep discharge which would result in reduced life. The stability of the system will therefore depend on levels of insolation, battery capacity, and load demand.

During the months of interest for carbon dioxide use, and therefore generation [generally late Spring to early Fall] daytime exceeds 10 hours, insolation is high, and the conditions are optimum for the system. In the event of continuous cloud coverage for up to two days, the system is de-rated only producing partial carbon dioxide output. A daily operating duration of the generator of 10-12 hours is anticipated.

The generation rate can be selected manually by operation of a rotary switch at varying discrete values of 0, 12, 18, 24, and 30 L./hour. Once the rate is set, generation of carbon dioxide is quasi-instantaneous. The rates, however, can be changed at will.

During operation, toroidal briquet is dissolved and the saturated toroidal briquet solution is decomposed into carbon dioxide and hydrogen. The carbon dioxide gas evolves through the apertures in the inner wall [central pipe] and is released through the discharge vent located at the approximate center of the lid. The lid also can hold means to scrub the gas phase and/or means to hold a secondary releaser that will continuously feed a pheromone, such as octenol, into the exhaust stream as may be necessary or desired to attract insects.

The foregoing has outlined some of the more pertinent objects of the generating and dispensing device. These objects should be construed to be merely illustrative of some of the more prominent features and applications of the generating and dispensing device. Many other beneficial results can be attained by applying the disclosed generating and dispensing device in a different manner or by modifying the generating and dispensing device within the scope of the disclosure. Accordingly, other objects and a fuller understanding of the generating and dispensing device may be had by referring to the summary of the generating and dispensing device and the detailed description of the preferred embodiment in addition to the scope of the generating and dispensing device defined by the claims taken in conjunction with the accompanying drawings.

SUMMARY

The above-noted problems, among others, are overcome by the generating and dispensing device. Briefly stated, the generating and dispensing device contemplates a sealed container with an easily removable lid which, when initialized, begins generating carbon dioxide at a pre-determined rate without intervention. The container has an upstanding inner cylindrical wall extending upward from the floor defining a first space outside the upstanding inner cylindrical wall and a second space within the upstanding inner cylindrical wall.

The lid has a hollowed shaft extending downward which is adapted to seat into the second space defined within the upstanding inner cylindrical wall. Attached to the lid and in the hollow space inside the shaft is a carbon dioxide generator. One or more OA toroidal briquets are placed in the first space of the container. Water is dispensed into the first space such that the water covers the top of the bottom OA toroidal briquet.

Then the shaft, with carbon dioxide generator attached to the lid, is set into the second space and the lid secured to the container. At least two conductive rods are attached to the carbon dioxide generator and extend up and past the top of the lid. Current from outside is applied to the rods. Carbon dioxide gases are thereby generated and directed from the container through a discharge vent in the lid above the shaft space and is captured for desired use.

The foregoing has outlined the more pertinent and important features of the generating and dispensing device in order that the detailed description that follows may be better understood so the present contributions to the art may be more fully appreciated. Additional features of the generating and dispensing device will be described hereinafter which form the subject of the claims. It should be appreciated by those skilled in the art that the conception and the disclosed specific embodiment may be readily utilized as a basis for modifying or designing other structures and methods for carrying out the same purposes of the generating and dispensing device. It also should be realized by those skilled in the art that such equivalent constructions and methods do not depart from the spirit and scope of the generating and dispensing device as set forth in the appended claims.

BRIEF DESCRIPTION OF THE DRAWINGS

For a fuller understanding of the nature and objects of the generating and dispensing device, reference should be had to the following detailed description taken in conjunction with the accompanying drawings in which.

DETAILED DESCRIPTION

Figure 1:
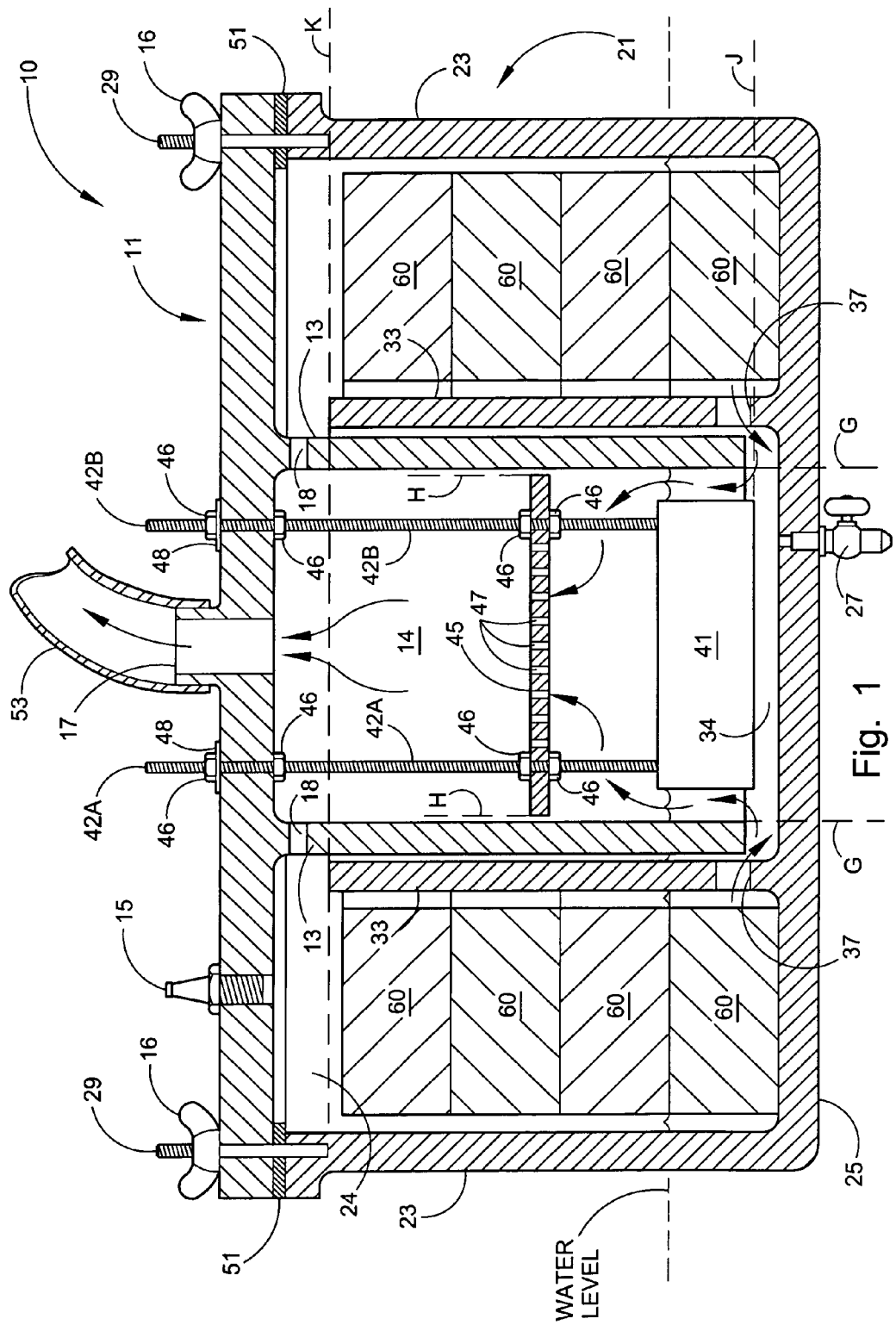
FIG. 1 is cross-section view of the generating and dispensing device in operational configuration.
Figure 2:
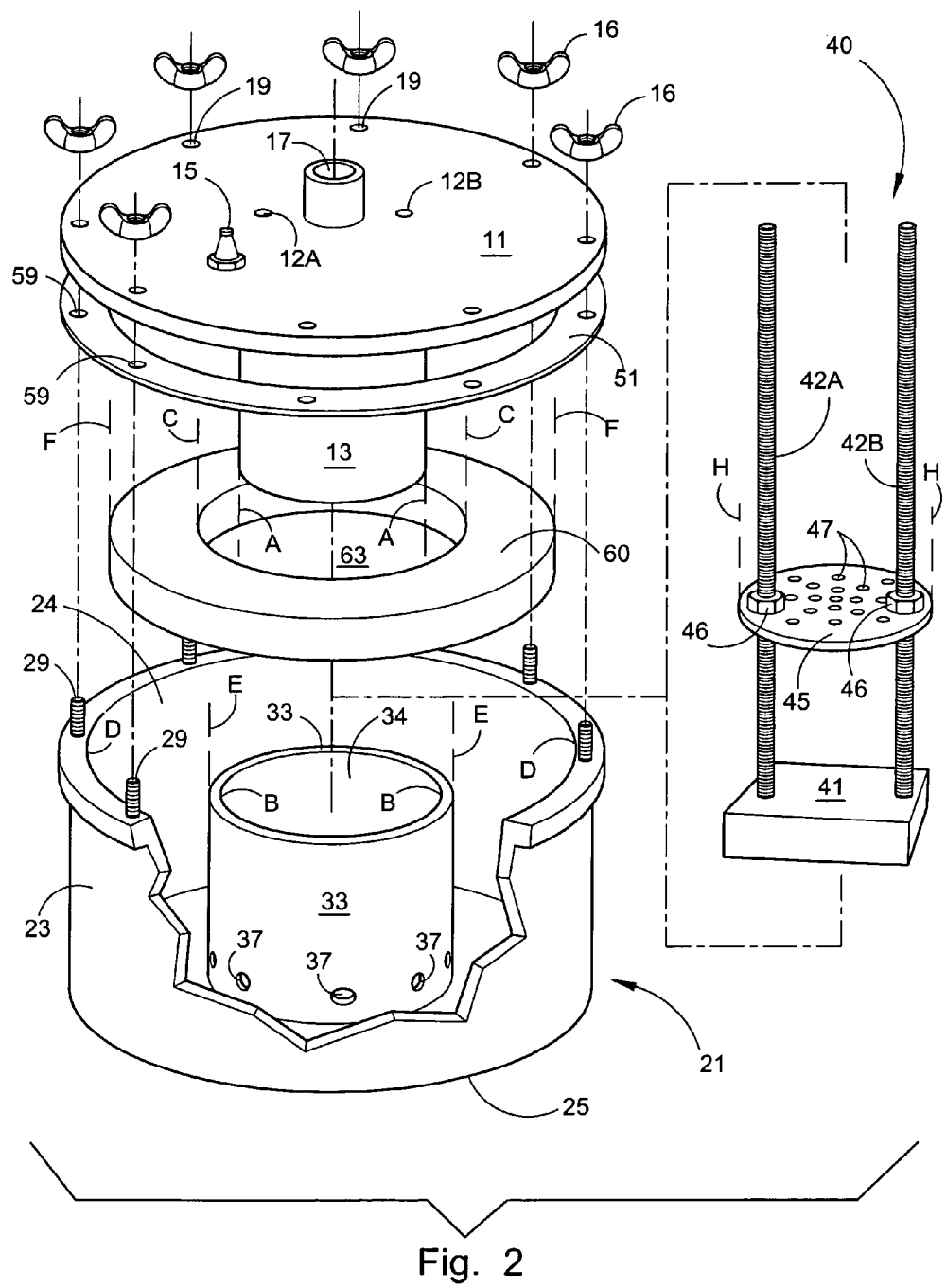
FIG. 2 is an exploded view of the generating and dispensing device.

Referring now to the drawings in detail and in particular to FIGS. 1 and 2, reference character 10 generally designates a carbon dioxide generation and dispensing device constructed in accordance with a preferred embodiment thereof. The device 10 has a container 21 with a floor 25, an upstanding outer wall 23, and an upstanding inner cylindrical wall 33 extending up from said floor 25 to a point below the top of the upstanding outer wall 23 referenced here as plane-K. A hollow first space 24 is defined between the upstanding outer wall 23 and the upstanding inner cylindrical wall 33 and a hollow second space 34 is defined within and inside of the inner cylindrical wall 33.

The outer diameter of the first space 24 is referenced herein as D or diameter-D and its inner diameter is referenced herein as E or diameter-E. The inner diameter of this first space 24, diameter-E, is also equal to the outer diameter of the upstanding inner cylindrical wall 33.

A plurality of apertures 37 on the inner cylindrical wall 33, near to the floor 25, permit the free flow of matter to be described below.

A lid 11 securely attaches to, and covers, the container 21. A conventional gasket or seal 51 is on the perimeter of the upstanding outer wall 23 providing a sealing component between the upstanding outer wall 23 and the lid 11. The lid 11 is secured to the container 21 by fastening means between the two. As illustrated the fastening means comprise a first externally threaded fastening component 29 connected to, and extending above, the upstanding outer wall 23 and a cooperating second internally threaded component 16.

As illustrated in FIG. 2, there are a plurality of externally threaded fastening components 29 around the upstanding outer wall 23. Additionally, there are a plurality of corresponding apertures 19 on the lid 11 which register with, and fit onto, each of the externally threaded fastening components 29. The seal 51 also has a plurality of corresponding apertures 59 which are in alignment with the corresponding apertures 19 on the lid 11 and with externally threaded fastening components 29. As illustrated here, the internally threaded components 16 are conventional wing-nuts. This configuration facilitates securing the lid 11 to the container 21 and further facilitates its removal from the container 21 when, and as, necessary.

A hollow cylindrical shaft 13 extends downward from the bottom surface of the lid 11 which, when inserted into the second space, will extend to a point above the floor 25. The outer diameter of the cylindrical shaft 13, referenced herein as A or diameter-A, is less than the diameter of the second space 34, referenced herein as B or diameter-B, thereby permitting the cylindrical shaft 13 to ride into the second space 34. Diameter-B also equals the inner diameter of the inner cylindrical wall 33.

Cylindrical shaft 13 is provided with a port 18 to equalize the internal pressure withing the device 10. One or more such ports 18 may be located anywhere on the cylindrical shaft 13. To facilitate the pressure equalization process, however, it is best that such ports 18 be above the top of the inner cylindrical wall 33, plane K.

A hollow shaft space 14 is defined within the cylindrical shaft 13. The shaft space 14 has a diameter referenced as G or diameter-G which also is the inner diameter of the cylindrical shaft 13.

The lid 11 had a discharge vent 17 for directing the release and dispensing of pre-determined amounts of the carbon dioxide gas being generated within the device 10. The discharge vent 17 is in communication with the shaft space 14. As illustrated, the discharge vent 17 is relatively centrally located on the lid 11, however, it may be located anywhere on the lid provided the discharge vent 17 remains in communication with the shaft space 14 such that gases generated within the device 10 are directed to and intended to be released only through the discharge vent 17.

Typically an external hose or conduit 53 is removably attached to the discharge vent 17 to thereby convey the releasing gases to a desired destination. The lid 11 also has a pressure relief valve 15 which will permit generated gases within the device 10 to escape should the pressure within reach a pre-determined level.

The container 21 somewhat resembles an angel-food-cake pan or a bundt-cake pan. The inner cylindrical wall 33 is generally centrally located and rises upward from the floor 25. An toroidal briquet 60, with its donut-like shape, fits around the inner cylindrical wall 33 and, being the first toroidal briquet 60 placed therein, will rest on the floor 25 in the first space 24.

FIG. 1 illustrates four toroidal briquets 60 stacked into the first space 24. A carbon dioxide generator 41 [electrolyzer] with its generator-housing component 40 seats into the second space 34 such that the bottom of the generator 41 generally should not be touching the floor 25. The bottom plane of the generator 41 is reference character J. The generator 41 should generally be slightly above the floor 25. It may, however, touch the floor 25, but it is preferred that it not to thereby allow the OA, when in solution, to freely flow underneath the generator 41.

The generator-housing component 40 holding the generator 41 comprises a guide plate 45 having a plurality of apertures 47 to permit generated gases to pass therethrough and up and out the discharge vent 17. The diameter of the guide plate is referenced herein as H or diameter-H and diameter-G [diameter of the shaft space 14] is greater than diameter-H.

At least two retaining rods 42A, 42B are affixed to the guide plate 45 with ends of the retaining rods 42A, 42B extending above and below the guide plate 45. The retaining rods 42A, 42B have external threading and are secured to the guide plate 45 by any suitable fastening components such as, but not limited to, nuts 46 with internal threading compatible with, and to, the external threading of the retaining rods 42A, 42B.

The upper ends of the retaining rods 42A, 42B register with apertures 12A, 12B on the lid 11 and pass through and extend above and beyond the lid 11. The retaining rods 42A, 42B must be produced using a conductive material for reasons to be explained below.

As illustrated, the generator 41 is attached to the retaining rods 42A, 42B. The guide plate 45 is attached to the retaining rods 42A, 42B at a point above the generator 41. The guide plate 45 is firmly secured in position by use of a nut 46 above the guide plate 45 and a nut 46 below the guide plate 45. The guide plate 45, with its diameter-H slightly smaller than the shaft space 14 diameter-G, eases and guides the extraction and insertion process of the generator-housing component 40 onto the lid 11.

Before this generator-housing component 40 is set into the lid 11 by inserting the retaining rods 42A, 42B through the respective lid apertures 12A, 12B, one nut 46 is threaded onto each retaining rod 42A, 42B and height-adjusted such that the bottom of the generator 41, when the lid 11 with generator-housing component 40 is set onto the container 21, does not contact the floor 25 and rests at approximately plane-J. When this height-adjustment is completed the generator-housing component 40 is firmly secured to the lid 11 first by placing a sealing ring 48 [such as, but not limited to, a rubber or other suitable washer] against the lid 11 followed by threading a nut on each of the retaining rods 42A, 42B extending above the lid 11. The sealing rings 48 will prevent gases generated within from escaping at that connection.

Several such lid-to-generator attachments should be pre-made so that a user need only remove the lid structure [lid 11 with generator 41 attached thereto as described above] of a processing unit and replace it with another lid structure.

This configuration makes replacing a worn or defective generator 41 an easy operation requiring little or no skill. The user merely removes the external hose 53 and unfastens the wing nuts 16 which secure the lid 11 to the container 21. The lid 11, with attached generator-housing component 40 and generator 41 attached, are removed with the lid. A previously pre-made lid-to-generator attachment is placed into the down the second space 34 and easily guided into place. No adjustments will be necessary as all such pre-made lid-to-generator attachments have been pre-made to approximately equal specifications.

FIG. 1 illustrates four toroidal briquets 60 inside the first space 24. Before the lid 11, with generator 41 attached, is secured to the container 21, water is placed into the first space 24 approximately up to the top surface of the generator 41 [illustrated here as the Water Level]. The lid 11 is then secured to the container 21 and the external hose 53 attached to the discharge vent 17.

In the event excess water is placed into the container 21, a discharge valve 27 on the bottom of the container 21, in communication with the second space 34, permits the user to easily discard any unwanted water by turning the discharge valve 27 to an open position, discharging water until the amount desired is left remaining, and turning the discharge valve 27 to the closed position. Similarly, use of the discharge valve 27 after carbon dioxide generation has completed, facilitates removal of any remaining aqueous OA solution from the container 21.

The toroidal briquet 60 is donut-like with a hole 63 in the approximate center. The diameter of the hole 63 is referenced as C or diameter-C which also is equal to the inner diameter of the toroidal briquet 60. The outer diameter of the toroidal briquet 60 is referenced as F or diameter-F. This outer diameter, diameter-F, is less than the outer diameter of the first space 24, diameter-D and the diameter of the central hole 63 of the toroidal briquet 60, diameter-C, is greater than the inner diameter of the first space 24, diameter-E.

After one or more toroidal briquets 60 are placed into the first space 24 and water dispensed up to the approximate top of the generator 41, the lid 11 secured to the container 21, and an external hose 53 attached to the discharge vent 17, a current is then applied to the retaining rods 42A, 42B to begin the generation and capture process.

Though wing nuts 16 and common internally threaded nuts 46 have been described with particularity herein as fastening components, it should be understood that any fastening component, suitable for the intended purpose, will suffice.

Additionally, the diameters disclosed herein are such that a relatively loose-fit is made between the outer diameter [diameter-A] of the shaft 13 and the diameter [diameter-B] of the second space 34 to preclude or best minimize escaping of any materials from the first space 24 into the second space 34 through any means other than as intended; i.e., through the plurality of apertures 37 on the upstanding inner cylindrical wall 33. An equally loose-fit is envisioned between the guide plate 45 [with diameter-H] and the diameter of the shaft space 14 [diameter-G] for the purpose of facilitating and easing the insertion and removal of the generator-housing component 40 from the lid 11 and the shaft space 14.

As described in the Background, which is incorporated herein by reference, the device, as part of the system, will continue to generate carbon dioxide, passing it through the device 10 as basically illustrated by the arrows in FIG. 1, for up to four weeks without need for human intervention.

The present disclosure includes that contained in the present claims as well as that of the foregoing description. Although this generating and dispensing device has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the generating and dispensing device. Accordingly, the scope of the generating and dispensing device should be determined not by the embodiment[s] illustrated, but by the appended claims and their legal equivalents.

Applicant has attempted to disclose all the embodiment[s] of the generating and dispensing device that could be reasonably foreseen. It must be understood, however, that there may be unforeseeable insubstantial modifications to generating and dispensing device that remain as equivalents and thereby falling within the scope of the generating and dispensing device.

What is claimed is:

1. A device for generating and dispensing carbon dioxide comprising:
   (a) a container having a floor with an upstanding outer wall around said floor extending upward to a top of said upstanding outer wall;
   (b) an inner cylindrical wall inside said container extending upward from said floor to a point below the top of said outer upstanding wall defining a first space between said inner cylindrical wall and said outer upstanding wall adapted to receive one or more solid oxalic-acid members and further defining a second space within said inner cylindrical wall adapted to receive an external carbon-dioxide generator;
   (c) a lid removably attachable to the top of said upstanding outer wall, said lid having a top surface and a bottom surface with a shaft extending downward from said bottom surface of said lid to a point above said floor wherein said shaft is adapted to nest into said second space, said shaft having a hollow interior shaft space with a diameter-G;
   (d) a plurality of apertures in said inner cylindrical wall adjacent to the floor thereby defining a passageway between said first space and said second space and said shaft space;
   (e) a discharge vent on said lid in communication with said second space and said shaft space; whereby as carbon dioxide is generated within said device the carbon dioxide passes through said shaft space and out said discharge vent to an external receiving member; and
   (f) a stack of one or more toroidally-shaped discs of solid oxalic-acid in said first space.

2. The device of claim 1 further comprising securing means for removably securing said lid to said container.

3. The device of claim 1 further comprising sealing means for sealing said lid to said container to prevent the unintended escape of carbon dioxide.

4. The device of claim 1 further comprising pressure relief means for relieving any excess pressure built-up inside said device while said device is generating and dispensing carbon dioxide.

5. The device of claim 1 further comprising a discharge means for removing fluid from said container.

6. The device of claim 1 further comprising generator housing means for receiving an external carbon dioxide generator and removably retaining the external generator inside said shaft space.

7. The device of claim 6 comprising at least two apertures on and through said lid through which at least two rods are removably secured, said at least two rods each having a rod top and a rod bottom wherein said rod top extends above said lid and said rod bottom extends downward into said shaft space wherein the external generator is removably attachable to and from said rod bottom.

8. The device of claim 7 wherein said at least two rods are comprised of conductive material.

9. The device of claim 7, further comprising a guide plate attached to said at least two rods, said guide plate having a diameter-H and located above the generator and below the lid, wherein diameter-G is greater than diameter-H.

10. A carbon dioxide dispenser, comprising:
   an outer container defined by an outer wall having a top and a floor;
   an upstanding pipe extending upwardly from said floor and defining an open upper mouth opposite said floor;
   a lid defined by a shaft extending downwardly therefrom, said shaft having a shaft wall to define an internal volume, said shaft wall terminating in a lower mouth opposite said lid, said shaft cooperating with said upstanding pipe and said outer wall whereby said shaft inserts within said upstanding pipe and said lower mouth is in spaced relation to said floor when said lid is attached to said outer wall top;
   a stack of one or more elements made of solid oxalic-acid located in a space defined between said upstanding pipe and said outer container outer wall; and
   a carbon dioxide generator suspended in said internal volume in spaced relation to said floor.

11. A carbon dioxide dispenser, comprising:
   an outer container defined by an outer wall having an open top and a closed floor, and defining an internal volume;
   a lid attachable to seal said open top, and further defined by a pair of current rods extending downwardly therefrom;
   a carbon dioxide generator suspended in said internal volume in spaced relation to said floor and said outer wall; and
   a stack of one or more elements made of solid oxalic-acid located in a space defined between said carbon dioxide generator and current rods and said outer wall, each said element defining a continuous ring-shaped form having a central aperture dimensioned to accept said carbon dioxide generator and current rods therein.

* * * * *